United States Patent
Palomo et al.

[11] Patent Number: 5,938,874
[45] Date of Patent: Aug. 17, 1999

[54] PROCESS OF MAKING MICROPOROUS FILM

[75] Inventors: Joseph A. Palomo, Ingleside; Cynthia A. Wichman, Woodstock, both of Ill.

[73] Assignee: Allegiance Corporation, McGaw Park, Ill.

[21] Appl. No.: 08/807,553

[22] Filed: Feb. 28, 1997

Related U.S. Application Data

[63] Continuation-in-part of application No. 08/195,953, Feb. 11, 1994, abandoned.

[51] Int. Cl.$^6$ ............................. B29C 65/08; B29C 67/20
[52] U.S. Cl. .................... 156/73.1; 156/78; 156/244.11; 156/244.17; 264/45.9; 264/49; 264/51; 264/444
[58] Field of Search .............................. 264/45.9, 49, 51, 264/444; 156/73.1, 78, 244.11, 244.17

[56] References Cited

U.S. PATENT DOCUMENTS

| | | |
|---|---|---|
| Re. 31,886 | 5/1985 | Hodgson . |
| Re. 31,887 | 5/1985 | Hodgson . |
| 2,668,294 | 2/1954 | Gilpin . |
| 2,973,523 | 3/1961 | Brainard et al. . |
| 3,645,835 | 2/1972 | Hodgson . |
| 3,770,537 | 11/1973 | Elton ................................... 264/49 X |
| 3,911,499 | 10/1975 | Benevento et al. . |
| 3,922,418 | 11/1975 | Lauchenauer . |
| 4,344,999 | 8/1982 | Gohike . |
| 4,408,357 | 10/1983 | Toth . |
| 4,433,026 | 2/1984 | Molde . |
| 4,674,132 | 6/1987 | Stein et al. . |
| 4,736,467 | 4/1988 | Schwarze et al. . |
| 4,819,275 | 4/1989 | Lunt . |
| 4,833,008 | 5/1989 | Derby . |
| 4,860,382 | 8/1989 | Markwell . |
| 4,867,881 | 9/1989 | Kinzer . |
| 4,869,952 | 9/1989 | Levy . |
| 5,024,851 | 6/1991 | Goad et al. . |
| 5,027,438 | 7/1991 | Schwarze et al. . |
| 5,050,242 | 9/1991 | Udell . |
| 5,069,907 | 12/1991 | Mixon et al. . |
| 5,082,721 | 1/1992 | Smith, Jr. et al. . |
| 5,126,182 | 6/1992 | Lumb et al. . |
| 5,150,660 | 9/1992 | Kuczynski . |
| 5,238,613 | 8/1993 | Anderson . |
| 5,359,735 | 11/1994 | Stockwell . |
| 5,547,996 | 8/1996 | Brandom et al. ...................... 521/134 |

FOREIGN PATENT DOCUMENTS 505027  9/1992  European Pat. Off. .

OTHER PUBLICATIONS

Ward, R.S. et al. "Development of Monolithic Breathable Barrier Films for Disposable Products", Known at Least Just Prior to the Filing Date Feb. 11, 1994 of the Parent Application, pp. 124–146.

*Primary Examiner*—Leo B. Tentoni
*Attorney, Agent, or Firm*—Kay H.P. Hannafan; Paul Schaafsma

[57] ABSTRACT

A microporous film can be made by adding a foaming agent to the components of a film material to create bubbles in the film. The microporous film can also be made by adding filaments to the components of the film material and dissolving the filaments to create the pores. In either process, the size of the pores can be controlled to be no greater than 0.027 μm.

21 Claims, 4 Drawing Sheets

PROCESS OF MAKING MICROPOROUS FILM

This is a continuation-in-part of application Ser. No. 08/195,953, filed Feb. 11, 1994, now abandoned.

FIELD OF THE INVENTION

The present invention relates generally to medical gowns and relates more specifically to gowns worn by medical personnel to provide effective protection against liquids and viruses. The present invention further relates to microporous films, methods to make microporous films and medical gowns made from the microporous films.

BACKGROUND OF THE INVENTION

Microporous films have been made in the past. Microporous films have small pores through the film which permit passage of objects through the film which have a size less than the pore size, such as water vapor. Objects which have a size greater than the pore size are prevented from passing through the film.

Existing microporous films have been made by use of a particle filler in the film, for example calcium carbonate. The film having the particle filler is stretched such that the particle filler falls out of the film. The stretching tension on the film is relieved and pores remain in the film where the particle filler had been in the film. Stretching methods of making microporous films require manufacturing steps to stretch the film and the amount of stretch must be controlled.

Surgical gowns have been used in the medical community to protect medical personnel from liquids and microorganisms during surgical and other medical procedures. Currently available gowns provide liquid barriers by having reinforced areas in at least a portion of the front and sleeves of a gown. Generally, such barrier materials are non-breathable films. For example, one barrier material currently in use is a polyethylene film which is laminated to a non-woven support material. A gown made entirely of this material is frequently found to be uncomfortable to wear. Although such gowns provide a barrier to liquid and microorganisms in critical areas, such gowns are not completely impervious to either liquids or viruses.

Another factor which influences the ability of a gown to act as an effective barrier to either liquids or viruses is the construction of the gown. In the past, gowns have been frequently constructed using stitching to connect one portion of a gown to another. Such stitching can create holes in the barrier material which may allow liquids or viruses to pass through the material.

SUMMARY OF THE INVENTION

A medical gown is described in which at least a portion of the gown is made from an effective liquid and viral barrier material which is breathable. The barrier material includes a support layer and a film layer adhesively laminated to the support layer. Adhesive lamination may include using a discontinuous coating of adhesive. In the preferred embodiment, the film is a microporous film structure and the support layer is capable of absorbing or wicking liquids. The micropouous film has a pore structure which permits water vapor to pass through the film while preventing liquids and viruses from passing through the film.

The microporous film can be made by adding a foaming agent to the components of the film material prior to extruding the film. Bubbles of a predetermined size are created with the foaming agent. The film material with the bubbles is extruded in an extruder to form the microporous film. The microporous film has a pore size related to the size of the bubbles.

The microporous film can also be made by adding filaments to the components of the film material prior to extruding the film. The filaments are selected to have a predetermined size which will relate to the pore size in the microporous film. The film is extruded in an extruder such that at least some of the filaments extend through the extruded film. The filaments are removed from the extruded film to create the pores in the microporous film. If the filaments are water soluble, the filaments can be removed by immersing the extruded film in a hot water bath to dissolve the filaments. Alternatively, an appropriate solvent could be used to dissolve the filaments depending on the material used to make the filaments.

The microporous film can be joined to one or more other layers, such as the support layer. For example, the microporous film can be laminated to a non-woven fabric support layer. The barrier material can be used to make a medical gown which is liquid proof, viral proof and breathable.

Accordingly, the present invention provides gowns which are comfortable for the wearer yet provides an effective barrier for both liquids and microorganisms.

The present invention provides microporous films and methods of making the microporous films in which the films can be used to make medical gowns.

The present invention also provides a medical gown in which at least a portion of the gown is made from a barrier material that includes a fabric support layer and a barrier film layer adhesively attached to the support layer.

The present invention further provides a gown in which the entire gown acts as an effective barrier with respect to both liquids and microorganisms.

The present invention provides a material and method of constructing a gown which reduces the possibility of penetration of either liquids or microorganisms through the gown.

DESCRIPTION OF THE PREFERRED EMBODIMENTS

Although the present invention can be made in many different forms, the preferred embodiments are described in this disclosure and shown in the attached drawings. This disclosure exemplifies the principles of the present invention and does not limit the broad aspects of the invention only to the illustrated embodiments.

Figure 1:
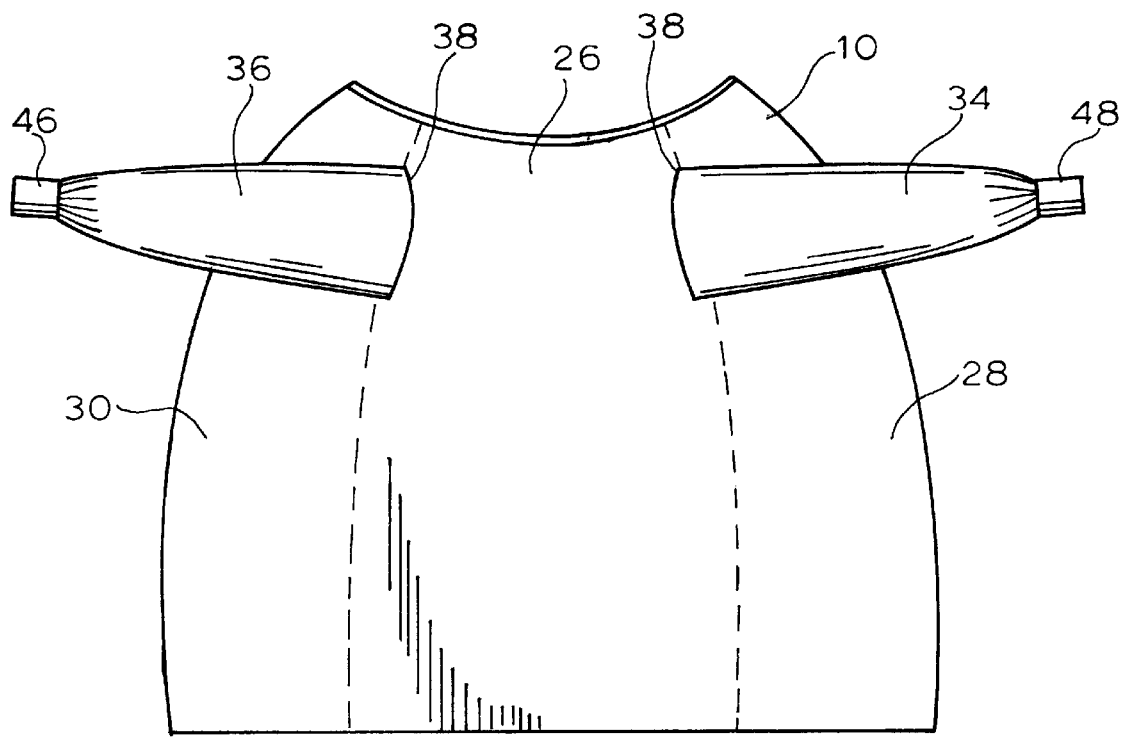
FIG. 1 is a diagram of a gown.

A typical medical gown 10 is illustrated in FIG. 1. This type of gown is used by medical personnel during surgery or other procedures in which liquids or microorganisms may be present. Generally, the purpose of the gown is to protect the wearer from liquids and microorganisms as much as possible. However, breathable gowns which act as a total barrier against microorganisms have not been possible in the past.

The present invention describes a barrier material which can be used to create either all or a selected portion of a gown. This material acts a both an effective liquid and microorganism barrier and is comfortable for the user to wear because it is breathable. Specifically, this material is capable of preventing viruses from passing through the material in accordance with test method ASTM ES22 which is a pass/fail test set forth by American Society for Testing and Materials. Because the material of the present invention is a relatively "breathable" material, an entire gown may be made from this material when it is desired to protect both the front and back of medical personnel from liquids and microorganisms.

Figure 2:
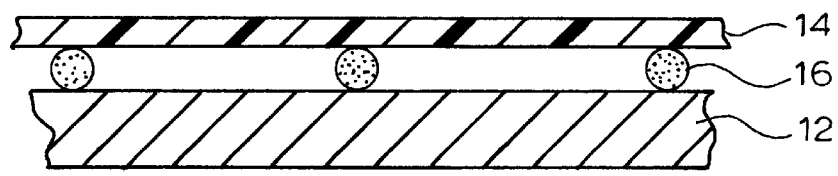
FIG. 2 is a cross-sectional view illustrating an embodiment of the material from which at least a portion of a gown of the subject invention is fabricated.

The basic structure of the material of the present invention is generally illustrated in FIG. 2. FIG. 2 is an illustrative cross-sectional view of the material from which gowns of the present invention are made in the preferred embodiment. As can be seen in FIG. 2, the material of the subject invention includes a support layer 12 and a film 14. Preferably, the film is adhesively laminated to the support layer 12 by a discontinuous coating 16. In the preferred embodiment, the film 14 is a microporous structure which will be discussed in greater detail below.

The support layer 12 can be made from a variety of materials. For instance, the support layer can consist of a material which is resin bonded, spunlaced, thermalbonded, spunbonded, spunbonded/meltblown/spunbonded (SMS) or wet laid or any combination thereof. Preferably, the support layer is nonwoven and may be made from polyester, nylon or polyolefin, for example. A wood pulp component may be present in the spunlaced nonwoven material. It is desired that the support layer be capable of wicking or absorbing liquids to enhance breathability of the gown. It is intended that the support layer is located next to the wearer's body and the film layer is away from the wearer's body. Thus, perspiration can wick or be absorbed into the support layer.

In one embodiment, the support layer is formed of a material supplied by Fiberweb North America under the trademark Cerex®. The Cerex® material is a 100% nylon spunbond nonwoven. In another embodiment, a polyester/wood-pulp nonwoven known as Sontara® and manufactured by E. I. DuPont De Nemours and Co. is a suitable material.

Figure 3:
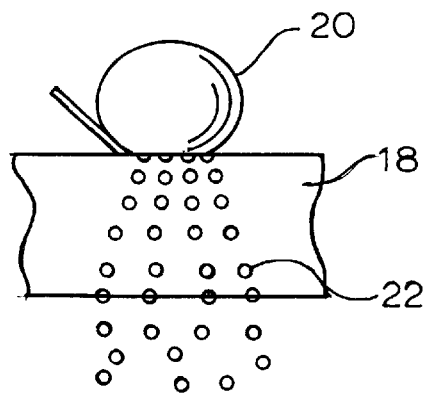
FIG. 3 is a diagram illustrating vapor diffusion through a monolithic membrane.

The features of the film layer when the film is a monolithic structure will now be described in greater detail as illustrated in FIG. 3. As can be seen in FIG. 3, a monolithic film 18 will not allow a liquid 20 to pass through the film. However, water vapor 22 may diffuse by activated diffusion.

The structure of a monolithic film is such that viral material and other microorganisms will not pass through the film as defined by ASTM ES22. Theoretically a monolithic film of any thickness will prevent microorganisms from passing through the film. However, with thinner films, the likelihood of pinholes in the film increases. Therefore, in one embodiment of the invention, the film used to produce a portion of a gown has at least a thickness of 0.5 mil. In other embodiments, the film may be as thick as 2.0 mil. However, generally speaking, as the film thickness increases the breathability of the film decreases.

In one embodiment, the film has a monolithic structure. This structure may be formed using a material selected from the group consisting of polymers of polyolefins, polyether, polyester, nylon, or urethanes of the blends of the above. A film manufactured by E. I. DuPont De Nemours and Co. under the trademark Hytrel® can be used as the film. Hytrel film is a thermoplastic elastomer. Hytrel film includes a block copolymer, consisting of a hard (crystalline) segment of polybutylene terephthalate and a soft (amorphous) segment based on long-chain polyether glycols.

Figure 4:
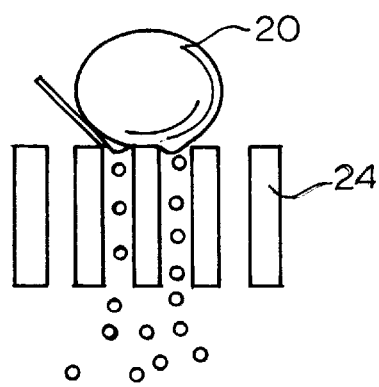
FIG. 4 is a diagram illustrating gaseous diffusion through a microporous membrane.

Referring to FIG. 4, in another embodiment of the invention, the film layer is a microporous film membrane 24. As can be seen in FIG. 4, a microporous film 24 also prevents liquids from passing through the membrane. However, water vapor may pass through the pores of the membrane. The microporous film also prevents liquid and viral penetration because the pores are smaller than the size of the virus. Preferably, the microporous film 24 is flexible and resilient. Examples of suitable materials that can be used to make the microporous film 24 includes polyolefins, thermoplastic elastomers, thermoset elastomers, polyurethanes, polyethylenes, polypropylenes or blends of these polymers.

Refer once again to FIG. 2. In this embodiment of the invention, the film 14 is adhesively laminated to the support material using a discontinuous coating technique. There are two reasons why the film is attached to the support material in this manner. First, the use of an adhesive to attach the film reduces the likelihood of holes being created in the film as it is attached to the fabric as compared to other methods. It is also anticipated that it may be possible to heat and/or ultrasonic bond the film to the support layer without compromising the barrier characteristics of the film.

A second reason for using a discontinuous coating of adhesive to attach the film 14 to the support layer 12 is to enhance the breathability of the material as compared to attaching the film using a continuous adhesive coating. The breathability is enhanced because perspiration or other liquids absorbed by or wicked through the support layer can readily come in contact with the film wherever an adhesive is not present. Therefore, such liquid can pass through the film in a vapor form in such locations. The support material and film can create a barrier material which has an MVTR having a minimum of 200 g/m$^2$/24 hr in accordance with ASTM E96B. Also, the barrier material can have an MVTR in the range of 600–900 g/m$^2$/24 hr.

In the preferred embodiment of the invention, it is important that the material used to fabricate at least a portion of the gown is liquid proof. By liquid proof, it is meant that the material has a Suter hydrostatic head of at least 80 cm. In the preferred embodiment, the material has a Suter hydrostatic head of at least 110 cm.

Refer once again to FIG. 1. In the embodiment illustrated in FIG. 1, the gown 10 includes a front portion 26 and a pair of back portions 28 and 30. In the gown illustrated in FIG.

Figure 5:
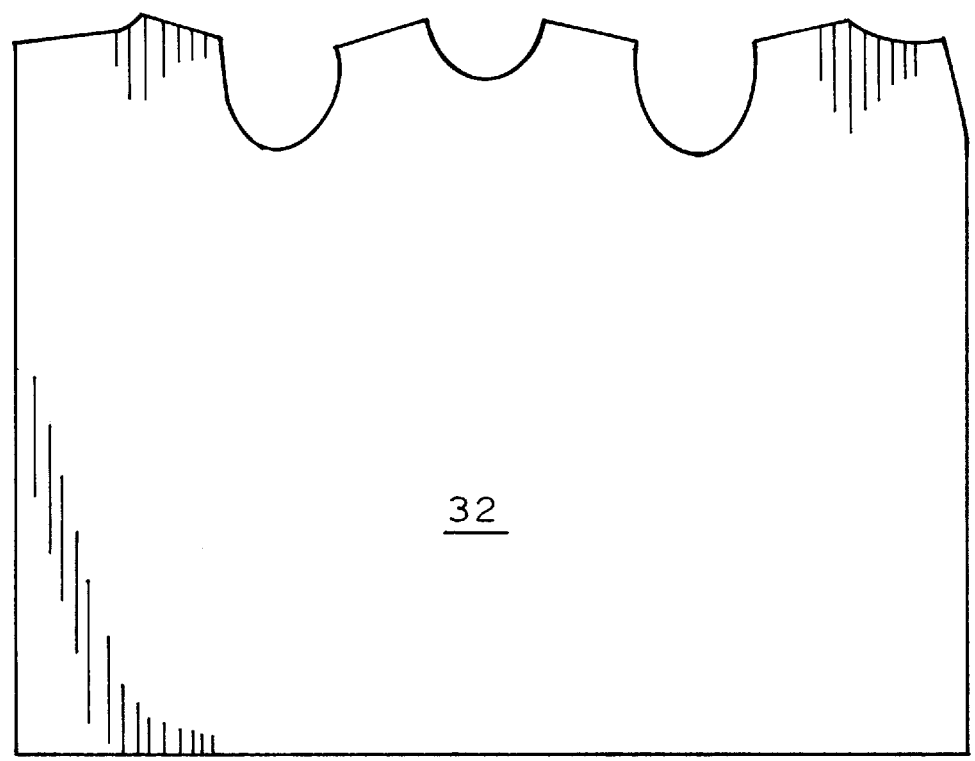
FIG. 5 illustrates the front and back portions of a gown cut from a single sheet of material.

1, the front portion and back portion are all constructed from a single piece of material. FIG. 5 illustrates the front and back portions of a gown cut from a single piece of material 32.

In the gown illustrated in FIG. 1, a pair of sleeves 34 and 36 are attached to the gown between the front and back portions. In one embodiment, the sleeve includes a sleeve seam which extends the length of the sleeve. In the preferred embodiment, the sleeve seam is sealed in such a manner as to reduce the possibility of creating holes in the material. Preferably, the sleeve seam is formed by heat sealing. In other adhesives or RF (radiofrequency) sealing. In one embodiment of the invention, the sleeves are sewn into the gown between the front and back portions. This type of construction is used when it is not considered to be vital to have the entire gown be liquid and viral proof. Because liquids and viral materials are relatively unlikely to come in contact with the shoulder seam 38 of the gown, in some instances a sewn construction of the seam is acceptable. If it is desired to eliminate the possibility of liquids or microorganisms passing through the shoulder area, the sleeves may be attached to the body of the gown using heat sealing or other non-hole creating techniques. In other instances, it may be desirable to form the gown using a raglan type construction in the shoulder area.

Figure 6:
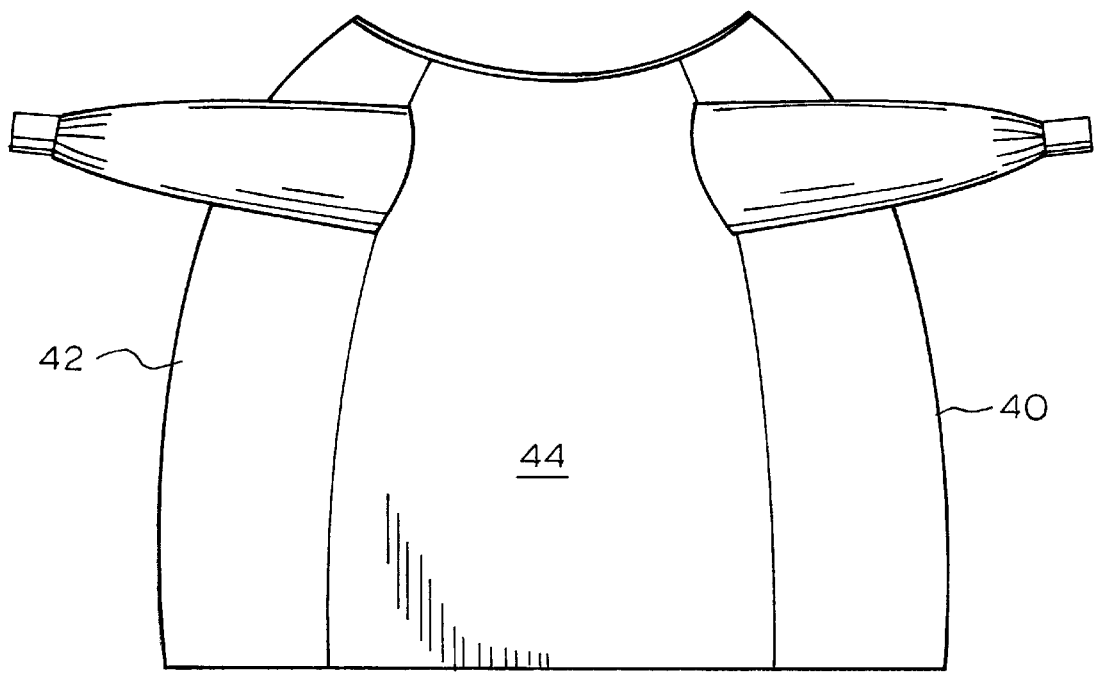
FIG. 6 illustrates a gown having back portions formed of a different material.

Refer now to FIG. 6 which illustrates another embodiment of a gown having back panels 40 and 42 which are formed from a separate material than the material used to form the front portion 44 of the gown. In one embodiment, the front portion 44 and back panels 40 and 42 may be formed using the same type of material. However, in other embodiments, it may be desirable to have only the front portion formed of the barrier material described herein and have the back panels formed of a non-barrier material. For the purposes of this patent application only, the term "non-barrier" is intended to describe a material which does not pass ASTM ES22 standards.

It should be noted that in most embodiments of the invention, it is expected that the sleeves will include a cuff which is not made of a barrier material. The cuffs 46 and 48 are generally made from a polyester stockinet knit. Cuffs are illustrated in FIG. 1.

The present invention also relates to methods to make microporous films. The microporous films can be used to make the medical gowns which are liquid proof, viral proof and breathable.

One method to make the microporous film includes the use of a foaming agent to create the pores in the microporous film. The foaming agent is added to the component material used to make the microporous film prior to the film being extruded. The foaming agent creates bubbles which form the pores in the microporous film after the film is extruded.

The materials used to make the microporous film include polyolefins, thermoplastic elastomers, thermoset elastomers, polyurethanes, polyethylenes, polypropylenes or blends of these polymers, for example. The foaming agent and the amount of the foaming agent (concentration of the agent) is selected depending on the predetermined size and amount of bubbles or pores in the microporous film. A foaming agent may be selected to provide bubbles and thus a pore size of below 0.027 µm in diameter. The microporous film for medical gown applications would typically have a thickness of about 0.002" or less.

The microporous film is made by adding the foaming agent to the film polymer. Bubbles are created by the foaming agent such that the bubbles have a predetermined size. The foaming agent may be premixed with the film polymer or added to an extruder used to extrude the microporous film, for example. The bubbles are formed while the film is still in a molten state, for example, as the film exits the extrusion die on the extruder. The bubbles are the pores in the resulting microporous film. In other words, the bubbles create an open pore structure in the film such that the pore size is related to the bubble size. The extruded microporous film is cooled after the extrusion process.

Figure 7:
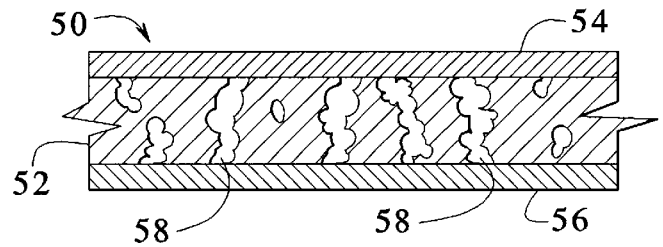
FIG. 7 shows a cross-sectional view of a three layer microporous film composite material.

The microporous film can be joined to other layers as desired. Referring to FIG. 7, a three layer barrier material 50 is shown. The barrier material 50 includes a microporous layer 52 joined to a first support layer 54 and a second support layer 56. The microporous layer 52 includes pores 58 which are formed by the bubbles of the foaming agent. The pores 58 interconnect such that a network structure of pores 58 are formed the microporous layer, i.e. passageways or voids are formed through the microporous layer. The support layers 54, 56 provide strength, durability and wicking as described above.

Figure 8:
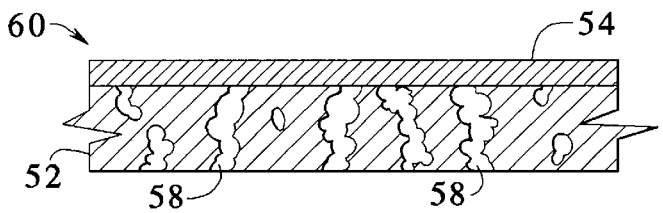
FIG. 8 shows a cross-sectional view of a two layer microporous film composite material.

The barrier material 60 shown in FIG. 8 is a two layer material. In the two layer embodiment, the barrier material 60 includes the microporous layer 52, having pores 58 which define a pore structure, joined to the support layer 54. The second support layer 56 is not included in the two layer embodiment.

Figure 9:
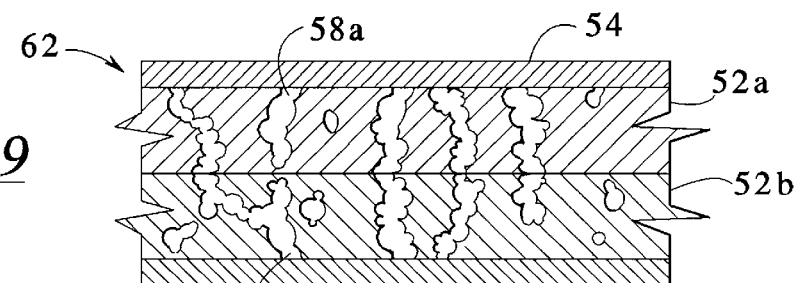
FIG. 9 shows a cross-sectional view of a four layer microporous film composite material.

Another barrier material 62 is shown in FIG. 9 as a four layer material. The barrier material 62 includes two microporous layers 52a, 52b joined together. Optionally, one or both of the support layers 54, 56 can be joined to the two microporous layers 52a, 52b. Specifically, one of the support layers is joined to one of the microporous layers and the other support layer is joined to the other microporous layer. Joining two microporous layers 52a, 52b together is particularly advantageous to enhance the barrier characteristics (prevention of liquid and viral penetration) of the barrier material. For example, if a foaming agent is used which creates bubbles, and thus pores, which are relatively large, then two microporous layers can be joined to effectively increase the resistance to liquid and viral penetration. In this manner, multiple microporous layers can be used to achieve the barrier characteristics of a single microporous layer having smaller pores.

Some of the pores 58a, 58b in the microporous layers 52a, 52b will line up with each other to provide breathability through the barrier material 62. Some of the pores 58a, 58b in the microporous layers 52a, 52b may line up entirely with each other, while other pores may only partially line up with each other. Other pores may not line up at all. In the instances where the pores do not line up with each other, breathability may still occur through those pores depending on the degree of sealing between the two microporous layers 52a, 52b. If the two microporous layers 52a, 52b are not completely sealed together, water vapor may possibly travel between the two microporous layers 52a, 52b from one pore in one of the microporous layers to another pore in the other microporous layer.

Figure 10:
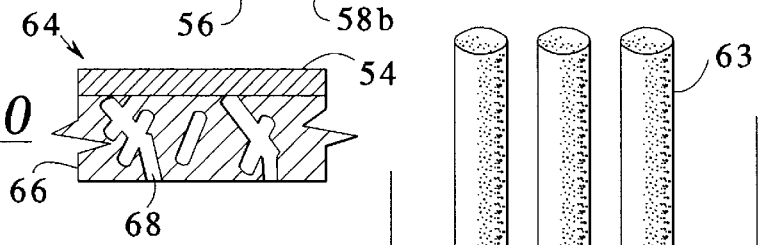
FIG. 10 shows a cross-sectional view of a microporous film made by the use of filaments.
Figure 11:
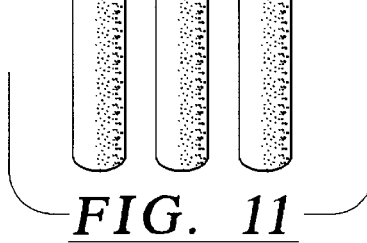
FIG. 11 shows a perspective view of one form of filaments which can be used to make pores in a microporous film.

Another method of making the microporous film includes the use of filaments 63 (FIG. 11). FIG. 10 shows a cross-sectional view of a barrier material 64 which includes a microporous layer 66 joined to the support layer 54. The microporous layer 66 has pores 68 which are created by the filaments 63. The pores 68 are voids left by the filaments 63 after the filaments 63 are removed. The size, quantity and shape of the filaments 63 is predetermined and selected to result in a desired size, quantity and shape of the pores 68 in the microporous film layer 66. The filaments 63 are added to the component materials used to make the film. The film components containing the filaments 63 are extruded into a film. At least some of the filaments 63 extend from one face of the extruded film to the other face. The filaments form an interconnecting matrix providing a tortuous path. The filaments 63 are then removed from the extruded film resulting in a film having pores through the film, which is the microporous layer 66. If the filaments 63 are made from a water soluble polymer, the filaments 63 are removed from the film by dissolving the filaments 63 in hot water which is at a temperature at least as high as the solubility temperature of the filaments. If the filaments 63 are made from a polymer material which is not water soluble, than an appropriate solvent can be used to dissolve the filaments 63. The solvent must be capable of dissolving the filaments 63 while not harming the microporous film.

FIG. 11 shows one form of the filaments 63 which can be used to make the pores 68 in the microporous film layer 66. The filaments 63 shown in FIG. 11 have a cylindrical shape, similar to fine, elongated fiber hairs. The filaments 63 may have a linear or non-linear shape. The length of the filaments 63 can vary such that a single filament 63 extends through the thickness of the microporous layer or such that a network of filaments 63 interconnect to form a network structure of pores through the microporous layer, i.e. passageways or voids are formed through the microporous layer.

Figure 12:
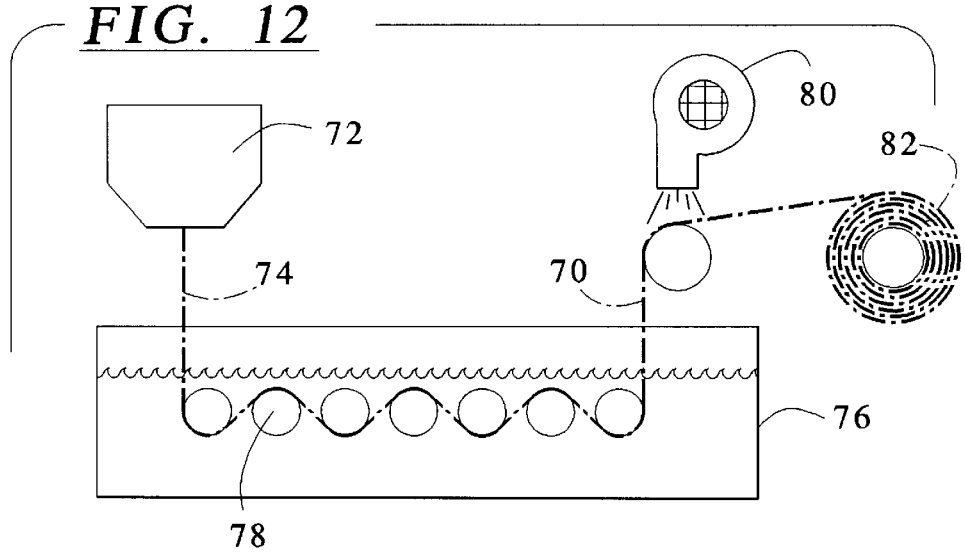
FIG. 12 shows schematic view of a microporous film being made by the use of water soluble filaments.

FIG. 12 shows a schematic diagram of a microporous film 70 being made by the use of the filaments 63. The film component materials and the filaments 63 are added to an extruder 72. In this example, the filaments 63 are made from a water soluble polymer, such as polyvinyl alcohol (PVOH) or polyvinyl pyrollidone (PVP), for example. A film 74 is extruded by the extruder 72 such that at least some of the filaments 63 extend through the thickness of the extruded film 74. The extruded film 74 is placed in a hot water bath 76 and may travel over various rollers 78. The temperature of the hot water bath 76 is at least as high as, and preferably higher than, the solubility temperature of the polymer filaments 63. For example, the hot water bath may have a temperature of about 180° F. to 200° F. The extruded film 74 is in the hot water bath 76 long enough to dissolve the polymer filaments 63. As the filaments 63 dissolve, pores 68 (FIG. 10) are formed in the extruded film where the filaments 63 used to be located. In this manner the microporous film 70 is made which has a pores size that corresponds to the size of the filaments 63 added to the microporous film material prior to the extrusion process.

As the microporous film 70 leaves the hot water bath 76, the film 70 is cooled, for example by a cool air blower 80. The microporous film 70 is wound up into a roll 82 after it is cooled in a take-up operation. The microporous film 70 is maintained under tension throughout the extruding, filament removing, cooling and take-up processes.

The microporous film 70 shown in FIG. 12 can be joined to other layers as described with reference to the microporous films shown in FIGS. 7–9.

Any two layers of the barrier materials shown in FIGS. 7–10 can be laminated by any known method. For example, layers can be joined by direct extrusion (extrusion coating), co-extrusion bonding, adhesive bonding, thermal bonding, or ultrasonic bonding. Breathable or non-breathable adhesives can be used in a continuous or discontinuous coating.

While the preferred embodiments have been illustrated and described, numerous changes and modifications can be made without significantly departing from the spirit and scope of this invention. Therefore, the inventors intend that such changes and modifications are covered by the appended claims.

We claim as our invention:

1. A method of making a microporous film comprising the steps of:

provinding a polymer film material capable of being extruded into a film;

adding a foaming agent to the film material;

creating bubbles of a predetermined size with the foaming agent in the film material said bubbles having a diameter of no greater than 0.027 μm; and extruding the film material with the bubbles in an extruder to form the microporous film, wherein the microporous film has a pore size related to the size of the bubbles.

2. The method of claim 1 wherein the bubbles are created by the foaming agent as the film material exits an extrusion die on the extruder.

3. The method of claim 1 further comprising the step of joining the microporous film to a film support layer.

4. The method of claim 3 wherein the joining step comprises one of direct extrusion bonding, adhesive bonding, thermal bonding, or ultrasonic bonding.

5. The method of claim 1 further comprising the step of joining a first film support layer to one side of the microporous film and joining a second film support layer to an opposite side of the microporous film.

6. The method of claim 5 wherein the step of joining the first film support layer to the microporous film comprises one of direct extrusion bonding, co-extrusion bonding, adhesive bonding, thermal bonding, or ultrasonic bonding.

7. The method of claim 6 wherein the step of joining the second film support layer to the microporous film comprises one of direct extrusion bonding, adhesive bonding, thermal bonding, or ultrasonic bonding.

8. The method of claim 1 further comprising the steps of:

making a first microporous film according to the method of claim 1;

making a second microporous film according to the method of claim 1; and laminating the first microporous film and the second microporous film together.

9. The method of claim 8 further comprising the step of laminating a first film support layer to one of the first or second microporous films.

10. The method of claim 9 further comprising the step of laminating a second film support layer to the other of the first or second microporous films.

11. A method of making a microporous film comprising the steps of:

providing a polymer film material capable of being extruded into a film;

adding filaments to the film material;

extruding the film material with the filaments in an extruder to form an extruded film such; and removing the filaments from the extruded film by dissolving the filaments to create pores having a size of no greater than 0.027 μm through the extruded film.

12. The method of claim 11 wherein the filaments are made from a water soluble polymer having a solubility temperature, and wherein the removing step further comprises the steps of:

contacting the extruded film with water at a temperature at least as high as the solubility temperature of the filaments;

dissolving the filaments in the water to create the pores in the extruded film; and cooling the extruded film having the pores.

13. The method of claim 11 further comprising the step of joining the microporous film to a film support layer.

14. The method of claim 13 wherein the joining step comprises one of direct extrusion bonding, adhesive bonding, thermal bonding, or ultrasonic bonding.

15. The method of claim 11 further comprising the step of joining a first film support layer to one side of the microporous film and joining a second film support layer to an opposite side of the microporous film.

16. The method of claim 15 wherein the step of joining the first film support layer to the microporous film comprises one of direct extrusion bonding, adhesive bonding, thermal bonding, or ultrasonic bonding.

17. The method of claim 16 wherein the step of joining the second film support layer to the microporous film comprises one of direct extrusion bonding, adhesive bonding, thermal bonding, or ultrasonic bonding.

18. The method of claim 11 further comprising the steps of:

making a first microporous film according to the method of claim 11;

making a second microporous film according to the method of claim 11; and laminating the first microporous film and the second microporous film together.

19. The method of claim 18 further comprising the step of laminating a first film support layer to one of the first or second microporous films.

20. The method of claim 19 further comprising the step of laminating a second film support layer to the other of the first or second microporous films.

21. The method of claim 11 wherein the filaments are made from a polymer soluble in a solvent, and wherein the removing step further comprises the steps of:

contacting the extruded film with the solvent;

dissolving the filaments in the solvent to create the pores in the extruded film.

* * * * *